United States Patent
Rouget et al.

(10) Patent No.: US 7,576,843 B2
(45) Date of Patent: Aug. 18, 2009

(54) OPTICAL DEVICE FOR BIOMETRIC CAPTURE BY CONTACT AND SYSTEM USING SAID DEVICE

(75) Inventors: Matthieu Rouget, Maisons Laffitte (FR); Laurent Lambert, Paris (FR); Jean-Christophe Fondeur, Levallois (FR)

(73) Assignee: Sagem Securite, Paris (FR)

( * ) Notice: Subject to any disclaimer, the term of this patent is extended or adjusted under 35 U.S.C. 154(b) by 309 days.

(21) Appl. No.: 11/571,095

(22) PCT Filed: Jun. 22, 2005

(86) PCT No.: PCT/FR2005/001578

§ 371 (c)(1),
(2), (4) Date: Dec. 21, 2006

(87) PCT Pub. No.: WO2006/008396

PCT Pub. Date: Jan. 26, 2006

(65) Prior Publication Data

US 2008/0062402 A1    Mar. 13, 2008

(30) Foreign Application Priority Data

Jun. 23, 2004   (FR) ................... 04 06843

(51) Int. Cl.
*G06K 9/74* (2006.01)
(52) U.S. Cl. ..................................... 356/71
(58) Field of Classification Search ............. None
See application file for complete search history.

(56) References Cited

U.S. PATENT DOCUMENTS

| 6,154,285 | A | 11/2000 | Chan et al. |
| 6,175,641 | B1 | 1/2001 | Kallo et al. |
| 6,815,657 | B2 * | 11/2004 | Toyoshima et al. ........... 356/71 |
| 6,856,383 | B1 * | 2/2005 | Vachris et al. .................. 356/71 |
| 6,927,844 | B2 * | 8/2005 | Higuchi et al. ................. 356/71 |
| 6,954,553 | B2 * | 10/2005 | Ikegami ....................... 382/124 |
| 2003/0063783 | A1 * | 4/2003 | Higuchi ....................... 382/125 |
| 2003/0202687 | A1 | 10/2003 | Hamid et al. |
| 2003/0215117 | A1 * | 11/2003 | Hata ........................... 382/124 |
| 2004/0026635 | A1 | 2/2004 | Won et al. |

* cited by examiner

*Primary Examiner*—Juan D Valentin
(74) *Attorney, Agent, or Firm*—Stites & Harbison PLLC; Douglas E. Jackson

(57) ABSTRACT

An optical device for biometric sensing by contact, comprising: an optical element (2) having a face (3) constituting a surface for apposition of a body part from which a biometric characteristic is to be sensed; a radiation source (6) for illuminating the face (3) of the optical element; and sensor means (9) for picking up the radiation coming from the face (3); the face (3) is coated in a thin layer defining a pattern and made of a material such that in association with the material constituting the optical element, the layer is transparent in the presence of radiation emitted by the radiation source (6) when a body part is placed on the face (3) and is significantly less transparent in the presence of external parasitic radiation (13) that is inclined relative to the face (3); whereby the image received by the sensor means can be distinguished depending on whether it is real or latent.

10 Claims, 3 Drawing Sheets

OPTICAL DEVICE FOR BIOMETRIC CAPTURE BY CONTACT AND SYSTEM USING SAID DEVICE

FIELD OF THE INVENTION

The present invention relates in general to the field of biometric sensing by contact, and in particular to sensing fingerprints, and it relates more particularly to improvements to optical devices for biometric sensing by contact and comprising:

an optical element having a face that constitutes at least in part a surface for apposition of a body part from which it is desired to sense a biometric characteristic;

a radiation source associated with said optical element to illuminate said face of the optical element; and sensor means suitable for picking up the radiation coming from said face of the optical element.

BACKGROUND OF THE INVENTION

In devices of the kind to which the invention applies, in particular for sensing fingerprints, the source of radiation (generally visible light) illuminates the body part (e.g. the finger); the portions of the part in contact with the face diffuse the radiation, and the diffused radiation passes through an optical system in order to each the sensitive surface of a sensor. That type of device operates well so long as the face on which the body part is placed is itself clean.

Nevertheless, after a body part such as a finger has been placed thereon, it is common for traces of grease to remain on the face. When the only radiation reaching said face comes from the source within the device, such traces of grease diffuse relatively little radiation, and the optical system is arranged to ensure that the sensor is not excited.

In contrast, it can happen that radiation from a relatively powerful external source (the sun, a halogen lamp, . . . ) reaches the above-mentioned face at an angle of incidence. Under such circumstances, the traces of grease present on the face can diffuse a relatively large quantity of light, that then reaches the sensor and excites it. The sensor then delivers an image of the traces of grease (a latent image). If these traces of grease are sufficient, the latent image as obtained in this way can reproduce sufficiently clearly a biometric characteristic (e.g. a fingerprint) of a person who has been processed previously, and that can lead to a wrong command (wrong detection that a body part has been applied, wrong authorization, . . . ).

Various solutions are known that have been proposed in order to attempt to solve the problem posed and to attempt to prevent the device from operating in response to latent images.

Thus, document US 2003/0202687 proposes forming a plurality of images of the body part which are then compared with one another. A difference detected between the images indicates that the part has moved, and makes it likely that a genuine body part is present, whereas strict identity between the images is representative of no movement and makes it likely that the images are latent images. A drawback of that prior art solutions lies in the fact that if the external source of radiation moves or if the system for acquiring biometric characteristics itself moves, then the latent images can vary in time and can be processed as though a body part was in place against the face.

Document WO 01/84477 relates to a device having a controllable internal radiation source. If images are acquired both with radiation and without radiation, then it becomes possible to discriminate between latent images and images of a body part for processing. Nevertheless, that prior art device presents the drawback of being ineffective when the external source switches off at the same time that the internal source, and it can also operate wrongly when the external source is not constant (e.g. sunlight through foliage, busy premises, moving sensor).

Document WO 97/14111 teaches the use of electrodes for measuring electrical properties at the surface of the optical element in order to detect the presence of a body part. Such a device which is intended in practice to detect fraud requires a specific analog electronic circuit; it is complex and expensive.

BRIEF SUMMARY OF THE INVENTION

An object of the invention is to propose a technical solution that is simple, that does not require any additional complex equipment, that is inexpensive to implement, and that can be applied equally well to new equipment being manufactured and to equipment already in existence, for the purpose of preventing an optical device for biometric sensing by contact being sensitive to latent images that appear under certain external lighting conditions.

For these purposes, in a first of its aspects, the invention provides a device as defined in the introduction, particularly but not exclusively for sensing fingerprints, which, when arranged in accordance with the invention, is characterized in that said face of the optical element is coated in a thin layer defining a pattern and made of a material such that in association with the material constituting the optical element, said layer is substantially transparent in the presence of the radiation emitted by the radiation source when a body part is placed on said face of the optical element, and is significantly less transparent in the presence of interfering external radiation that is inclined relative to said face of the optical element.

By means of this arrangement, the image received by the sensor means can be distinguished as to whether it constitutes a real image or a latent image.

Numerous possible solutions can be envisaged for forming the thin layer that is placed on the face of the optical element. Thus, provision can be made for the layer to be deposited as extra thickness in said predetermined pattern; alternatively, the layer could be constituted by having a transmission index that varies with said predetermined pattern.

Furthermore, said layer may be deposited directly on the face of the optical element or else, in a variant, it may be formed on a continuous transparent film, and it is the film that is deposited on the face of the optical element.

In practice, the optical element may be a prism whose base constitutes said face.

The material constituting the optical element may commonly be made of glass.

In a manner that is simple to implement, the material constituting the layer may be an oxide known as indium-tin-oxide (ITO).

In a second of its aspects, the invention provides an installation for biometric sensing by contact, the installation comprising:

at least one optical device for biometric sensing by contact as set out above;

memory means for storing the pattern formed by the thin layer;

detector means for detecting in an image received by the sensor means, the presence of the image of said pattern in superposition on a fingerprint image; and discriminator means for rejecting as a latent image an image received by the sensor that is formed by the image of the pattern superposed on a fingerprint image.

BRIEF DESCRIPTION OF THE DRAWINGS

The invention will be better understood on reading the following detailed description of certain preferred embodiments given purely as non-limiting examples. In the description, reference is made to the accompanying drawings, in which.

DETAILED DESCRIPTION OF THE INVENTION

Figure 1A:
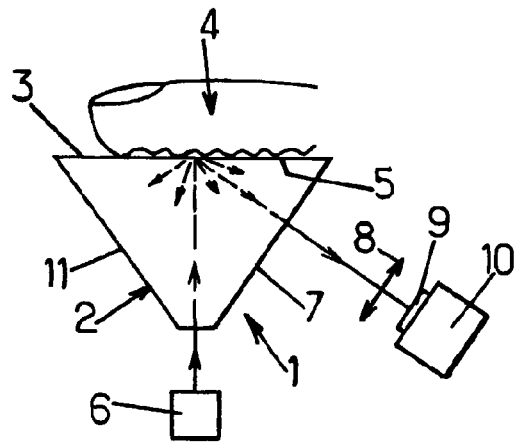
FIG. 1A is a diagrammatic view of an optical device for biometric sensing by contact to which the invention applies.

FIG. 1A is a highly diagrammatic view showing the main structure of an optical device for biometric sensing by contact, which device is given overall reference 1. The device 1 as shown comprises an optical element 2 (in this case constituted by way of example by a prism of trapezoidal section) having one face 3 (in this case the large face of the prism) constituted at least in part by a surface for apposition of a body part from which a biometric characteristic is to be sensed.

By way of concrete example, since this is the most common although not exclusive example, the device 1 is assumed to be for making an image of fingerprints 5 of a finger placed on the face 3 of the prism.

The device 1 also includes a radiation source 6, generally a visible light source, which is associated with the optical element 2 in such a manner as to illuminate the above-mentioned face 3. In general, since this is the simplest solution to implement, the radiation source 6 illuminates the face 3 through the optical element 2, as shown in FIG. 1A. In the example shown in FIG. 1A, the radiation source 6 is situated facing the small face of the prism opposite from its large face 3, and the radiation is directed substantially perpendicularly to the face 3 such that the finger 4 is illuminated from in front. In the presence of a finger, the projecting zones of the finger absorb radiation and then re-emit it in all directions, in particular towards the sensor, whereas the sensor picks up no radiation from the furrows of fingerprints or when there is no finger.

A portion of the radiation diffused by the face 3 leaves the optical element through a side face 7 and is focused by focusing means 8 on sensor means 9, which means then deliver electrical signals to a processor unit 10.

Figure 1B:
FIG. 1B is an image of a fingerprint detected by the sensor means of the FIG. 1A device under normal operating conditions.

Under the lighting conditions shown in FIG. 1A, the sensor means 9 receive a "positive" image of fingerprints 5 (the ridges are pale, the furrows are dark) as shown in FIG. 1B, when a finger 4 is placed on the face 3. In contrast, when no finger is placed on the face 3, the sensor 9 is adjusted not to be excited by the residual light reflected by the face 3.

It can be observed at this point that the provisions specific to the invention as explained below can also be applied when the lighting is of the "shadow" type, i.e. when the radiation source is disposed facing the other sloping face 11 of the prism 2 so as to illuminate the face 3 with grazing light. The image received by the sensor 9 is then a "negative" image (dark ridges, pale furrows).

Figure 2A:
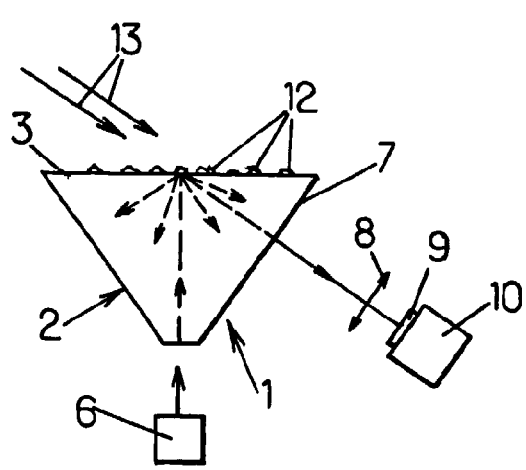
FIG. 2A is a diagrammatic view of the FIG. 1A device under abnormal operating conditions.

The apposition of a finger on the face 3 can leave traces of grease, represented coarsely at 12 on the prism 2 of FIG. 2A. Under certain circumstances, it can also happen that the face 3 receives external radiation 13 (parasitic radiation) that is relatively intense (sunlight, halogen lamp, . . . ), that is inclined relative to the face 3, and that is directed approximately perpendicularly to the outlet sloping face 7 of the optical element 2. This parasitic radiation shows up the traces of grease 12, and because of its angle of inclination, reaches the sensor means 9.

Figure 2B:
FIG. 2B shows a latent image of the kind that can be detected by the sensor means under the abnormal operating conditions shown in FIG. 2A.

If the traces of grease 12 are significant, the sensor means 9 then receive a fingerprint image as shown in FIG. 2B (a false image or a "latent" image) which, because of its relatively complete appearance and its sufficient contrast, is processed like a real image obtained from a finger present on the face 3.

Such a situation is unacceptable because of the errors to which it leads and to the risks of fraud to which it can give rise.

Figure 3A:
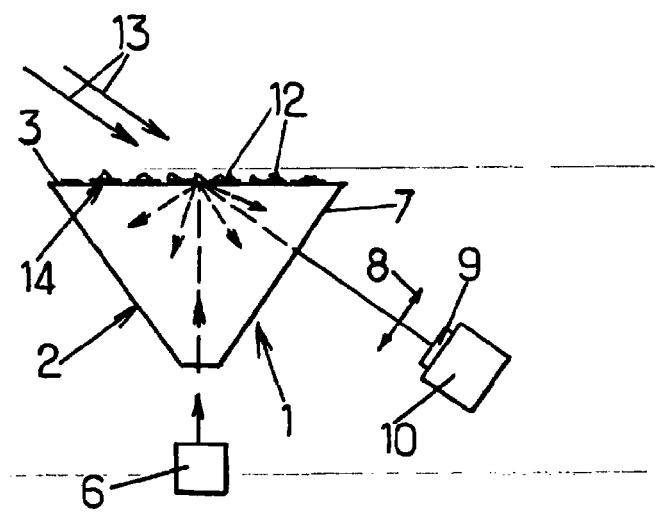
FIG. 3A is a diagram of the FIG. 1A optical device arranged in accordance with the invention and shown under the operating conditions of FIG. 2A.
Figure 3B:
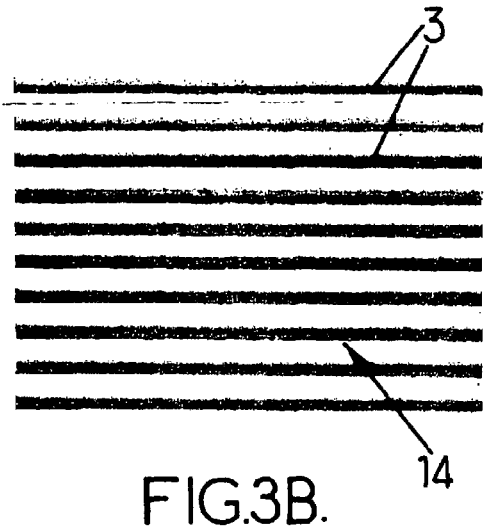
FIG. 3B is a diagram of the pattern applied on the face of the optical element of FIG. 2A in accordance with the invention.

As shown in FIG. 3A, the invention makes provision for the face 3 of the optical element 2 to be coated in a thin layer 4 defining a pattern (which pattern could be arbitrary and has no incidence on implementing the provisions of the invention). FIG. 3B shows a portion of the face 3 as fitted in this way. The layer 14 is made of a material which is such that when facing ambient air and the material from which the optical element 2 is made, the layer 14 is substantially transparent in the presence of the radiation emitted by the radiation source 6 when a finger 4 is placed on the face 3, while being substantially less transparent in the presence of parasitic radiation 13 in the absence of a finger placed on said face 3.

In other words, the material of the layer 14 possesses a radiation transmission coefficient that is slightly different from that of the material constituting the optical element 2 (in practice slightly less than, i.e. the layer 14 is slightly less transparent than the optical element 2).

Under such conditions, the pattern formed by the layer 14 is invisible in the presence of radiation directed perpendicularly to the face 3, and under normal conditions of operation of the device (lighting perpendicular to the face 3 and no parasitic radiation), the pattern formed by the layer 14 remains invisible for the sensor 9 which receives only the image of the finger as shown in FIG. 1B.

Figure 4:
FIGS. 4 and 5 are views of images picked up by the sensor means in various operating conditions of a device arranged in accordance with the invention.

In contrast, the pattern of the layer 14 becomes apparent in the presence of parasitic light. The image that the sensor 9 can receive when no finger is placed on the face 3 and when the face 3 is clean (no traces of grease) is analogous to the image shown in FIG. 3B: the sensor receives only the image 17 of the pattern of the layer 14. FIG. 4 shows the image picked up by the sensor in the presence of a finger placed on the face 3: the sensor picks up the image 15 of the fingerprint clearly without the pattern of the layer 14 being visible through the image (the image 17 of the pattern might still be visible, but only around the image 15 if the field of view is larger than the finger, as shown in FIG. 4). Finally, in the presence of traces 12 only on the face 3 (no finger placed thereagainst), the sensor 9 picks up the latent image 16 corresponding to the traces superposed on the image 17 of the pattern of the layer 14 that is visible through the latent image, as shown in FIG. 5.

Figure 5:

It is then easy, given that the shape of the pattern of the layer 14 can be stored in memory, to discriminate amongst the images received by the sensor 9 between those that correspond to FIG. 4 and those that correspond to FIG. 5, by looking for the presence or the absence of the image 17 of the pattern of the layer 14 in the image of the fingerprint. These discriminator means can, in particular, be included in the processor means 10.

The layer 14 may be made of any material that is suitable for giving rise to the looked-for result. In particular, this layer can be constituted by indium-tin-oxide (ITO) commonly used in objects and suitable for being deposited as a very thin layer. Other materials, such as transparent polymers, could also be used.

Figure 6A:
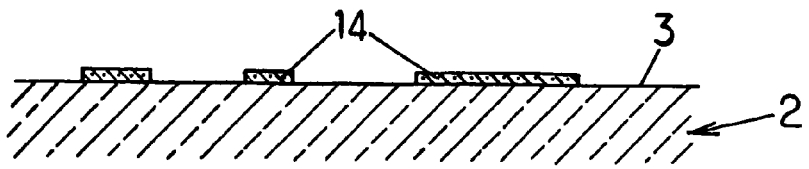
FIGS. 6A to 6C show several variant embodiments of dispositions of the invention in the device of FIG. 1A.

The layer 14 may be deposited directly on the face 3 of the optical element 2, through a mask, in order to form the required pattern as shown in FIG. 6A. The layer 14 is then discontinuous.

Figure 6B:
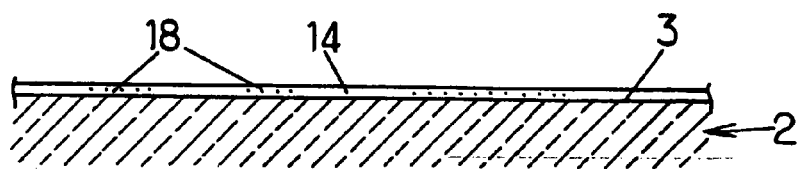

It is also possible, as shown in FIG. 6B, to envisage forming a continuous layer 14 of substantially constant thickness, presenting transparency analogous to that of the optical element 2, with the exception of localized positions 18 that are distributed and configured to present the predetermined pattern.

Figure 6C:
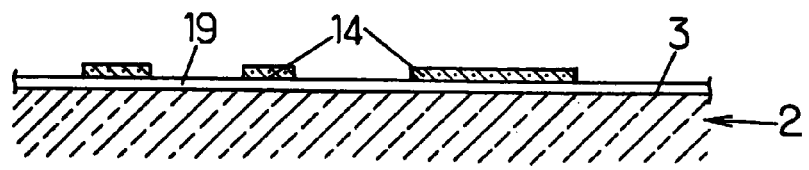

Another advantageous solution consists in making the predetermined pattern on a separate substrate that can itself be placed on the face 3. The layer 14 in FIG. 6B could be made in this way; the selective deposition of the layer 14 envisaged in FIG. 6A could be implemented on a continuous transparent film 19, itself applied to the face 3, as shown in FIG. 6C.

A most useful advantage of the provisions in accordance with the invention lies in the fact that it is possible not only to fit the invention to new equipment, but also to retrofit it to equipment already in operation, and in a manner that is relatively simple and inexpensive.

Another advantage of the provisions of the invention lies in the fact that these provisions are independent of the structure of the device (direct or shadow lighting) and of the way the optical element is made (out of glass, synthetic material) providing the index of the layer 14 matches that of the optical element 2.

Another advantage of the provisions of the invention lies in the fact that they do not alter the structure of the sensor device nor its operation, apart from the discriminator means that need go be implemented in order to eliminate latent images.

Figure 7:
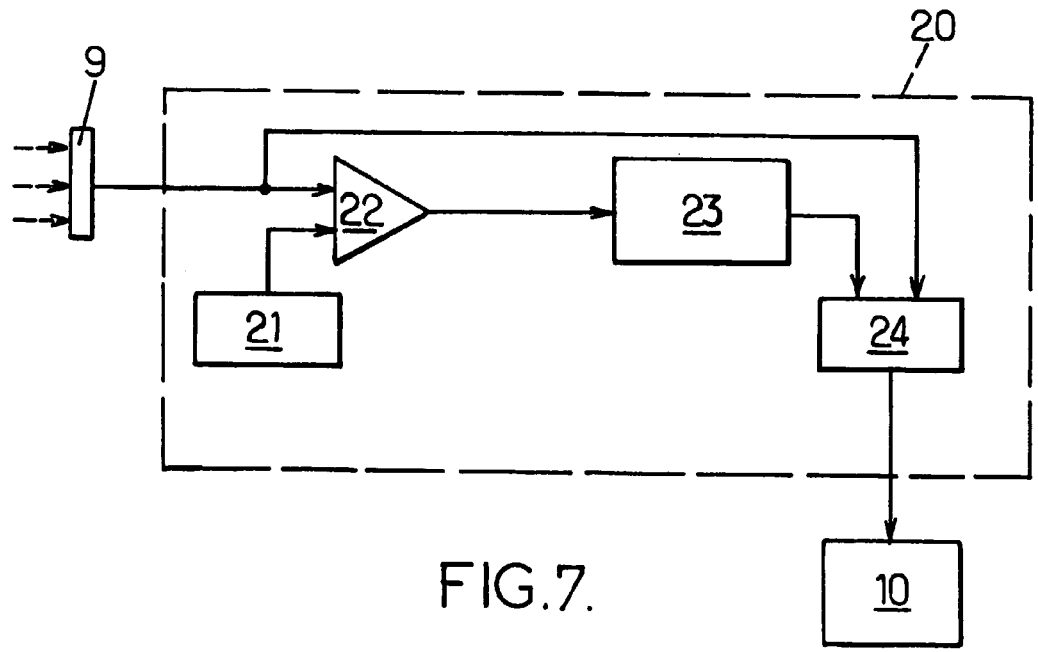
FIG. 7 is a simplified block diagram of a biometric sensor installation arranged in accordance with the invention.

These discriminator means are given overall reference 20 in FIG. 7 and can advantageously be integrated as an initial stage in the above-mentioned processor unit 10. They may comprise memory means 21 for keeping in memory data that defines the pattern formed by the layer 14, comparator means 22 suitable for comparing the data stored in 21 with the data delivered by the sensor 9, selector means 23 for delivering a first signal (a blocking signal) if the comparator means identify a pattern image superposed on a fingerprint image (as shown in FIG. 5), or a second signal (an unblocking or confirmation signal) if the comparator means identify a fingerprint image on its own (as shown in FIG. 4). The output from the selector means 23 is connected to one input of a gate 24 whose other input receives the signal output by the sensor 9. The gate 24 is closed under the control of the first signal and it delivers no signal (of a latent image), while it is opened under the control of the second signal, in which case the signal coming from the sensor is delivered to the processor unit 10 (a real image). The comparator means 22 and the selector means 23 thus define detector means suitable for controlling discrimination means implemented in the form of the gate 24.

What is claimed is:

1. An optical device for biometric sensing by contact, the device comprising:

an optical element having a face that constitutes at least in part a surface for apposition of a body part from which it is desired to sense a biometric characteristic;

an electromagnetic radiation source associated with said optical element to illuminate said face through the optical element with electromagnetic radiation substantially perpendicular to said face; and sensor means suitable for picking up reflected radiation coming from said face of the optical element;

wherein said face of the optical element is coated with a thin layer defining a predetermined repeating pattern and made of a material such that, in relation with the material constituting the optical element, said thin layer defining said predetermined pattern is transparent to the electromagnetic radiation emitted by the radiation source when a body part is placed on said face of the optical element and is significantly less transparent for an interfering external electromagnetic radiation that is inclined relative to said face of the optical element and without any body part being apposed on said surface of the optical element, whereby the image received by the sensor means can be discriminated as to whether it constitutes a real image or a latent image.

2. A device according to claim 1, wherein said thin layer is deposited on the face of the optical element as extra thickness in said predetermined pattern.

3. A device according to claim 1, wherein said thin layer is deposited continuously on the face of the optical element and has a transmission index that varies so as to provide said predetermined pattern.

4. A device according to claim 1, wherein said thin layer is deposited directly on said face of the optical element.

5. A device according to claim 1, wherein said thin layer is formed on a continuous transparent film and wherein said film is deposited on said face of the optical element.

6. A device according to claim 1, wherein said optical element is a prism having a base which is said face.

7. A device according to claim 1, wherein the material constituting the optical element is glass.

8. A device according to claim 1, wherein the material constituting said thin layer is ITO.

9. A device according to claim 1, wherein it is arranged to sense fingerprints.

10. An installation for biometric sensing by contact, comprising:

at least one optical device for biometric sensing by contact in accordance with claim 1; and discrimination means comprising:

memory means for storing an image of said predetermined pattern formed by the thin layer;

detector means for detecting, in an image received by the sensor means, the presence of the image of said predetermined pattern in superposition on a fingerprint image; and a gate connected to said detector means and to said sensor means respectively, for rejecting as a latent image an image received by the sensor that is formed by the image of the predetermined pattern superposed on a fingerprint image.

* * * * *